(Model.)   3 Sheets—Sheet 1.
W. J. MORGAN.
COMBINED SEEDER AND ROLLER.
No. 246,535.  Patented Aug. 30, 1881.
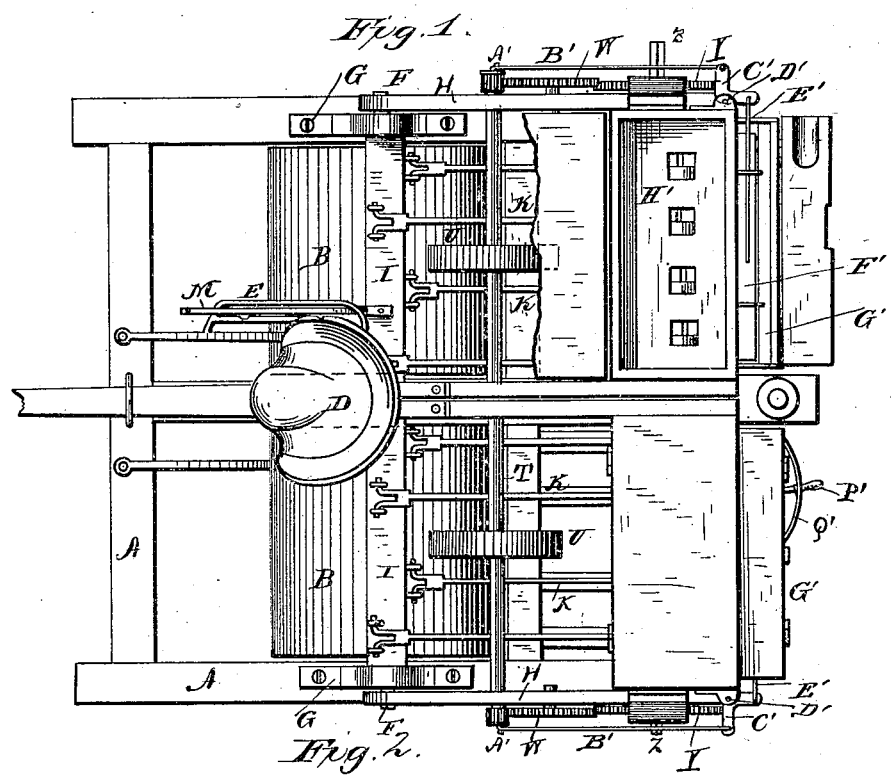
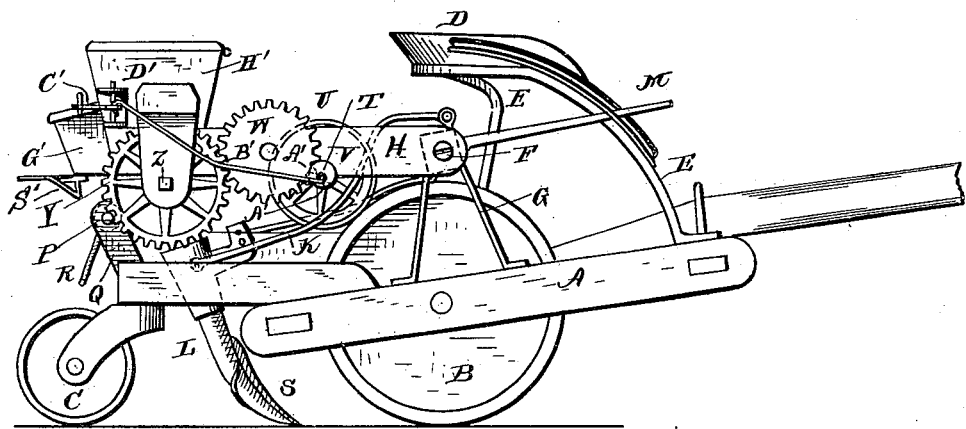
Witnesses.
Franck L. Durand
H. Aubrey Toulmin
Inventor
W. J. Morgan
By Alexander & Mason
Attorneys (Model.)

3 Sheets—Sheet 2.

W. J. MORGAN.
COMBINED SEEDER AND ROLLER.

No. 246,535. Patented Aug. 30, 1881.

Witnesses.
Franck L. Ouraud
H. Aubrey Toulmin

Inventor
W. J. Morgan
By Alexander & Mason
Attorneys

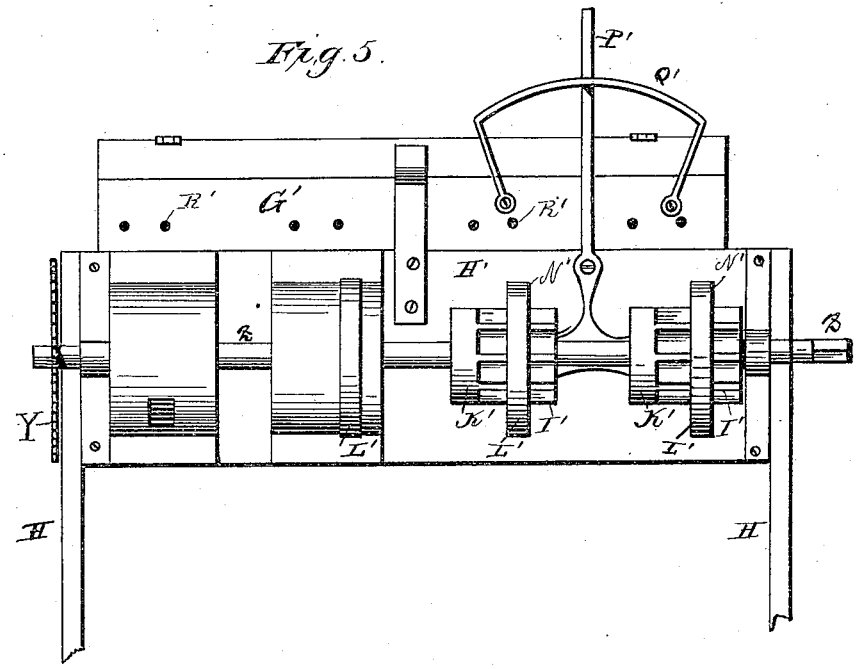
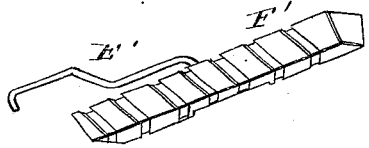
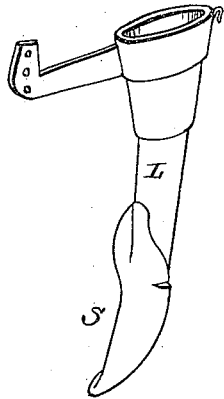

UNITED STATES PATENT OFFICE.

WILLIAM J. MORGAN, OF HILLSBOROUGH, ASSIGNOR TO JOHN S. LUCAS AND ENOCH W. COSTELLOW, OF BERRYVILLE, OHIO.

COMBINED SEEDER AND ROLLER.

SPECIFICATION forming part of Letters Patent No. 246,535, dated August 30, 1881.

Application filed April 1, 1881. (Model.)

*To all whom it may concern:*

Be it known that I, WILLIAM J. MORGAN, of Hillsborough, in the county of Highland, and in the State of Ohio, have invented certain new and useful Improvements in a Combined Seeder and Roller; and I do hereby declare that the following is a full, clear, and exact description thereof, reference being had to the accompanying drawings, and to the letters of reference marked thereon, making a part of this specification.

This invention relates to certain improvements in a combined land - roller, grain - drill, and seeder; and it consists in certain new and improved combinations and arrangements of parts, as more fully hereinafter set forth, and specifically pointed out in the claim.

Figure 3:
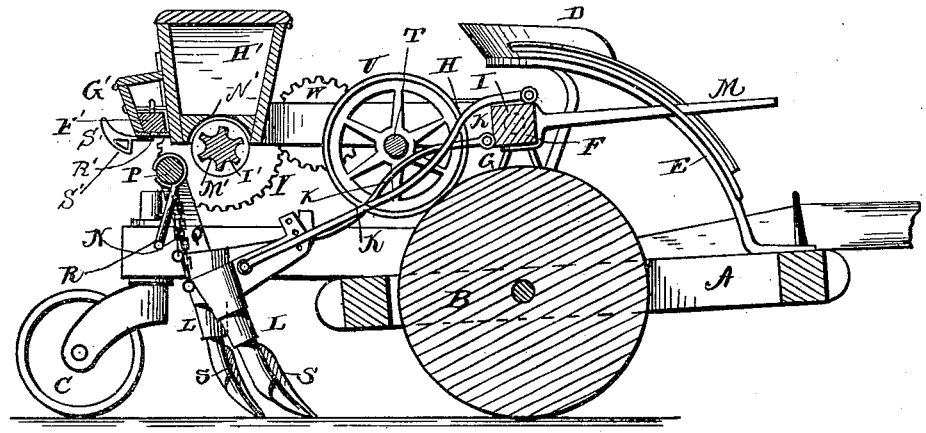
Figure 4:
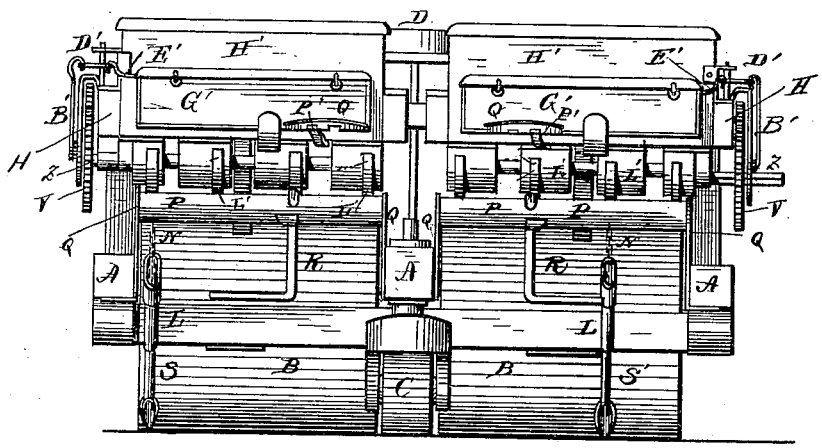

In the drawings, Figure 1 represents a top view of my apparatus entire; Fig. 2, a side elevation of the same; Fig. 3, a longitudinal vertical section of the apparatus; Fig. 4, a rear elevation of the same; Fig. 5, a detached view of the grain and seed hoppers, looking at the bottom of the same; Fig. 6, a detached view of the seed-distributer for distributing the seed from the seed-hoppers, and Fig. 7 a detached perspective view of one of the shoes.

The letter A indicates the frame of the apparatus, which is mounted upon the independent roller B and a caster-roller, C, at the rear.

D indicates the driver's seat, mounted on standards E, secured to the frame.

The letter F indicates a transverse shaft mounted in standards G, to which are secured the swinging frames H, which carry the grain and seed hoppers and their operating mechanism. The said shaft has also mounted on it two oscillating rectangular beams, I, to which the bent rods K, carrying the shoes L, are secured. These rods K are alternately attached to the upper and lower edges of the beams I, so that when the said beams are oscillated by means of the lever M the shoes will be thrown into line with each other, or alternately in two separate lines, according to the extent of the movement of the lever. The shoes at their rear upper ends are secured by means of chains N to the independent rock-shafts P, which are journaled in standards Q, and are provided with bent arms R, by which the shaft may be turned to elevate the shoes. The shoes are formed with curved pointed lower extremities and with sharp cutting-edges S, by means of which they are enabled to cut through the ground without difficulty.

The letter T indicates two transverse shafts journaled in the swinging frames H, and carrying the friction - rollers U, which are adapted to bear upon and be rotated by the rollers B. The said shafts at their outer ends are provided with pinions V, which intermesh with the cog-wheels W, intergearing with the cog-wheels Y on the shafts Z, which actuate the grain - distributing devices. The pinions V are provided with wrist - pins A', which connect, by means of links B', with the angle-levers C', pivoted at D', and connecting, by means of rods E', with the transversely - reciprocating seed - distributers F', located in the seed-hoppers G', which are secured to the rear of the grain - hoppers H'. The grain-hoppers are provided with a series of apertures in their bottoms corresponding to the shoes employed, and directly below said apertures, in suitable semicircular recesses, are located rigidly on the driving-shaft a series of fluted distributing-wheels, I', which are provided with solid heads K' at one end, the other ends being provided with loose heads L', having projections M', which set into the flutes in the wheels, so that the loose heads will be rotated with the wheels. The said loose heads are prevented from longitudinal movement by means of the recesses N', in the bottom of the grain-hoppers in which their upper edges set. The shafts Z are capable of a slight longitudinal movement in their bearings, and are capable of being adjusted longitudinally by means of the levers P', fulcrumed to the under side of the grain-hopper, and extending under segmental detents Q', by which the lever may be held in any desired position. It will be seen that by this means the capacity of the flutes on the distributing-wheels may be varied by causing the wheels to move back or forth longitudinally in the loose heads, so as to regulate the quantity of grain delivered.

The seed - distributers F' are grooved obliquely on their sides and on their bottoms, so as to pass the seed in proper quantities out of the seed-distributing apertures R'.

The arms R, when elevated to raise the shoes, are secured under the catches S' on the grain-hoppers in such manner as to elevate the swinging frames and raise the friction-rollers from the rollers B, and thus throw the working parts out of motion.

The caster at the rear of the machine supports the frame in such manner as to take the weight off the draft-bar and relieve the animals of all the weight of the draft pole or bar.

Having thus described my invention, what I claim, and desire to secure by Letters Patent, is—

The main frame mounted on independent rollers, and provided with standards having journaled therein a rock-shaft provided with arms, to which the seed-shoes are attached, said shoes adapted to be ranged in line transversely or alternately out of line with each other, in combination with the independent swinging frames, pivoted also to the rock-shaft and carrying the seeding-hoppers and the independently-operating friction-rollers and seeding mechanism, substantially as specified.

In testimony that I claim the foregoing I have hereunto set my hand this 5th day of March, 1881.

WILLIAM J. MORGAN.

Witnesses:
  J. M. HUGHEY,
  WILLIAM DILL.